United States Patent

[11] 3,615,870

[72] Inventor Marvin Snyder Crouthamel
Pennsauken, N.J.
[21] Appl. No. 757,398
[22] Filed Sept. 4, 1968
[45] Patented Oct. 26, 1971
[73] Assignee RCA Corporation

[54] THERMOELEMENT ARRAY CONNECTING APPARATUS

5 Claims, 4 Drawing Figs.

[52] U.S. Cl. .................................................. 136/204,
29/573, 136/205, 136/211, 136/212, 174/68.5,
317/101 CM
[51] Int. Cl. .................................................. H01v 1/30
[50] Field of Search .......................................... 174/68.5;
317/101 B, 101 C, 101 CC, 101 CM, 101 D;
136/203–205, 211, 212; 29/625, 626

[56] References Cited

UNITED STATES PATENTS

| | | | |
|---|---|---|---|
| 3,322,655 | 5/1967 | Garibotti et al. .............. | 29/621 UX |
| 3,379,577 | 4/1968 | Bird, Jr. .............. | 136/205 |
| 3,409,475 | 11/1968 | Breneman .............. | 136/203 |
| 3,471,753 | 10/1969 | Burks et al. .............. | 174/FP |

*Primary Examiner*—Darrell L. Clay
*Attorney*—Edward J. Norton

ABSTRACT: To construct a thermoelement array connecting apparatus in a thermoelectric cooling module, a soft copper layer is electroplated over a metallized wafer of beryllia. Narrow grooves are cut through the copper layer and metallized layer and into the beryllia to form small pads to which thermoelements are attached. Thereafter certain of the pads are recoupled together to form the proper array.

(a), (b)

INVENTOR
MARVIN S. CROUTHAMEL

BY Edward J. Norton
ATTORNEY

INVENTOR
MARVIN S. CROUTHAMEL
BY
ATTORNEY

INVENTOR
MARVIN S. CROUTHAMEL

BY Edward J. Norton
ATTORNEY

THERMOELEMENT ARRAY CONNECTING APPARATUS

The invention herein described was made in the course of or under a contract or subcontract thereunder with the Department of the Air Force.

This invention relates to a thermoelectric module and more particularly to the apparatus in such a module which interconnects the thermoelements to form the thermoelectric circuit array, and a method of making such an apparatus.

Thermoelectric devices which operate according to the Peltier phenomenon are well known in the art. In such devices, electric current is passed along a designated serially connected path of thermocouples which form the array. Each thermocouple may consist of, for instance, a P-type and an N-type semiconductor thermoelement connected together at one end by a bridging pad. When current is passed through the serially connected thermocouples of the array, a temperature difference is generated between two sides of each thermoelement. When the thermoelements are arranged so that all of the hot sides are thermally coupled together and all of the cold sides are thermally coupled together, a single thermoelectric stage results. However, the maximum temperature difference a single stage array can develop is limited by presently available thermoelectric materials and presently known construction techniques.

To overcome the former limitation, multistage modules have been constructed in which two or more thermoelectric stage arrays are pyramided together. In a two-stage device, for instance, the first stage would lower the temperature from X degrees at its hot side to Y degrees at its cold side. If the cold side of the first stage is thermally coupled to the hot side of a second stage through an interstage member, the second stage would further lower the temperature to Z degrees at its cold side. Thus a greater temperature differential is obtained.

To overcome the latter limitation, that is construction techniques, the thermoelement array connecting members and the interstage members must possess at least three features. First, they must have a very high thermal conductance so that there is substantially no temperature drop through the members. If temperature drops occur in the member, an increase in temperature difference between thermoelement junctions will result, and thus the efficiency of the module will decrease. The second feature is that the members must possess a low coefficient of expansion so that the thermoelements and their bonds will not crack due to constant expansion and contraction when the device is turned off and on. Third, the members must have a rapid time response and this requires that the members have low density and specific heat characteristics. In addition to these three features, the thermoelement array connecting member will have to be capable of having many small bridging pads readily attached to it and each of the pads will have to be electrically isolated from every other one. Furthermore, there must be a minimum of thermal loss between the pad and the member.

In prior art devices, each bridging pad had to be individually affixed to the interstage member, which was an electrical conductor, such as copper. Thus, each pad furthermore had to have an electrical insulator between it and the interstage member to prevent short circuits between the pads. One technique used was to solder one side of the pad to one side of an electrical insulator and thereafter solder the combination to the proper position on the interstage member. This had to be done for each pad.

Several construction problems resulted due to this technique including the occurrence of short circuits between the pads due to solder flowing into the gaps separating them, poor solder joints resulting in structural weaknesses, thermal losses, and above all, large costs.

It is an object of this invention to provide an improved thermoelement array connecting apparatus.

It is a second object of this invention to provide a method of constructing an improved thermoelement array-connecting apparatus.

These objects are realized by electroplating a layer of a high electrically and thermally conducting material onto at least one side of a material which includes a thermally conducting and electrically insulating member. Grooves are then cut through the plated layer and INTO the electrically insulating material to form a plurality of small electrically isolated pads.

An embodiment of the invention is explained in detail hereinafter with reference being made to the following figures in which.

FIG. 3*a*, shows the front view of a four stage thermoelectric cooling module using this invention.

FIG. 3*b*, shows the right side view of the FIG. 3*a* module, and

FIG. 4*a* –*j* show how each side of the interstage members are cut to get the required current path.

Figure 1:
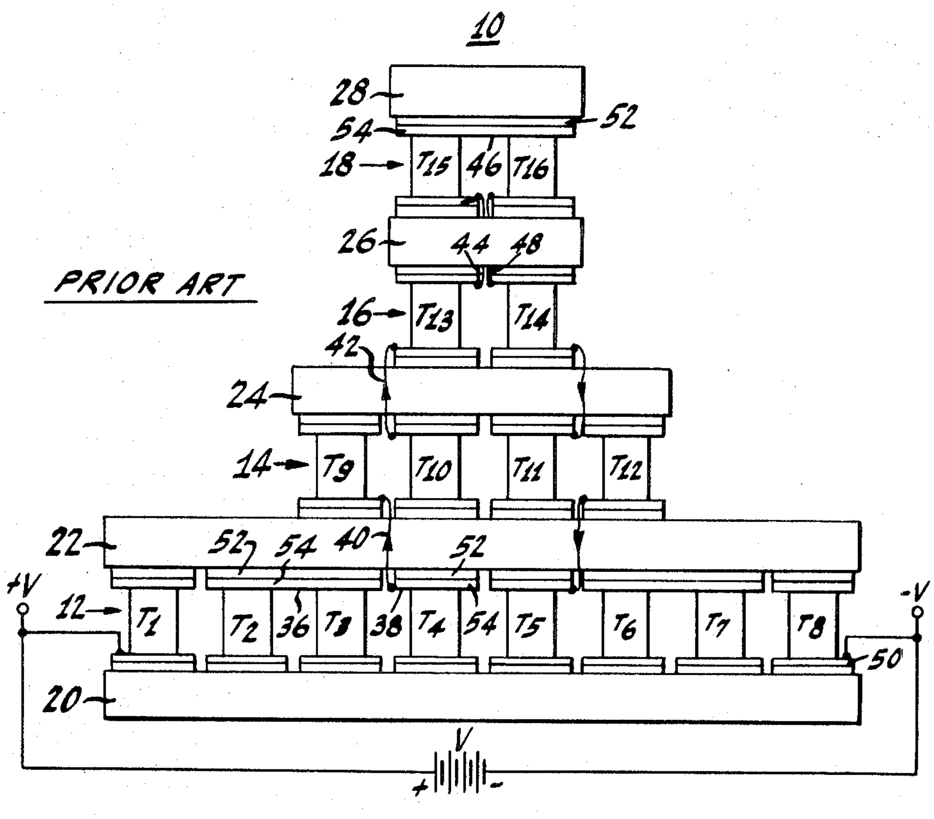
FIG. 1 shows a four stage thermoelectric module typical of the state of the art.

Referring to FIG. 1, a front view of a four-stage thermoelectric cooling module 10, typical of the prior art, is shown. Each of the four stages 12, 14, 16 and 18 includes a plurality of thermoelements $T_n$ arranged in rows and columns. In FIG. 1 the first row $T_1$–$T_8$, $T_9$–$T_{12}$, $T_{13}$–$T_{14}$, and $T_{15}$–$T_{16}$ of the thermoelements $T_n$ in each stage is seen. Each of these thermoelements $T_n$ is the first one of a respective column which is not seen in this view. The first stage 12 is separated from the heat-rejecting apparatus (not shown) by interstage member 20. The first and second stages 12 and 14, second and third stages 14 and 16, and third and fourth stages 16 and 18 are separated by respective interstage members 22, 24 and 26, and the fourth stage 18 and the heat absorbing apparatus (not shown) are separated by interstage member 28. Each of the interstage members 20–28 must be a good thermally conducting material so that there is no temperature gain between the cold side of one stage and the hot side of the next stage. A metallic material such as copper has been used in the past for these members.

Each thermoelement is either a P-type or an N-type semiconductive thermoelectric material, such as bithmuth telluride. When two opposite conductivity thermoelements are coupled together at one end to form a thermocouple and current flows towards the coupling in the N-type thermoelement and away from the coupling in the P-type thermoelement, the coupled ends of the thermoelements become colder than the other ends. The opposite of this is also true so that if current flows towards the coupled end of a P-type thermoelement and away from the coupled end of an N-type thermoelement, the uncoupled ends become colder than the coupled ends.

Figure 2:
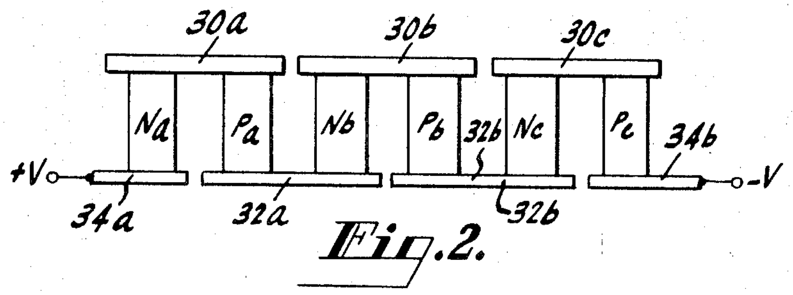
FIG. 2 shows how the current flows through the thermoelements.

FIG. 2 shows three N-type thermoelements $N_a$, $N_b$ and $N_c$ and three P-type thermoelements $P_a$, $P_b$ and $P_c$, coupled together by cold side-coupling straps **30*a*, 30*b* and 30*c* and hot side-coupling straps 32*a* and 32*b*. The hot sides of two end thermoelements $N_a$ and $P_c$ are coupled to the respective positive and negative sides of power supply V by respective terminals 34*a* and 34*b*. The current path is thus from +V through terminal 34*a*, through thermoelement $N_a$, through cold side-coupling strap 30*a*, through thermoelement $P_a$, through hot side-coupling strap 32*a*, through thermoelement $N_b$ and so forth to terminal 34*b* and then to −V. In this situation cold side-coupling straps 30*a*, 30*b*, and 30*c* become colder than hot side-coupling straps 32*a* and 32*b* and terminals 34*a* and 34*b***.

Referring again to FIG. 1, the current path in module 10 is from +V to thermoelement $T_1$. Then the current path runs from thermoelement $T_1$ up and down the thermoelements in the column headed by thermoelement $T_1$ in the manner shown in FIG. 2. The current then flows over a coupling strap (not shown) which couples the hot ends of the last thermoelements in each of the columns headed by thermoelements $T_1$ and $T_2$, down the column headed by $T_2$ and finally to the cold side of thermoelement $T_2$. The current then flows through coupling strap 36 and down through thermoelement $T_3$, up and down the thermoelements in the column headed by thermoelement $T_3$, over the column headed by thermoelement $T_4$ and eventually to the cold side of thermoelement $T_4$. Current then flows through pad 38, through wire 40 which connects the cold side of thermoelement $T_4$ to the hot side of thermoelement $T_9$. The current then flows up and down the thermoelements in the column headed by thermoelement $T_9$, over to the column headed by thermoelement $T_{10}$, up or down the thermoelements in that column until it finally flows up through thermoelement $T_{10}$, and into wire 42 which connects thermoelement $T_{10}$ and $T_{13}$. The current then flows through the thermoelements in the column headed by thermoelement $T_{13}$, into wire 44 which connects the last thermoelement in the column headed by thermoelement $T_{13}$ and thermoelement $T_{15}$. The current then flows up through thermoelement $T_{15}$, through coupling strap 46, down through thermoelement $T_{16}$, through wire 48 to the last thermoelement in the column headed by thermoelement $T_{14}$, and so forth down the right side of module 10 in the same manner it went up the left side ultimately reaching terminal 50 at the hot side of thermoelement $T_8$. The current then flows back to the negative side of the source −V.

The reason for having a current path as just described is to that the two terminals of source V and the terminals for the other three stages are all at the same temperature and therefore no heat is shunted between the sources.

The hot and cold side-coupling straps connecting the thermoelements in the proper series circuit must be good thermal and electrical conductors, such as copper. Furthermore, each strap must be electrically isolated from every other one in the circuit to avoid electrical short circuits which would cause certain thermoelements to be bypassed. In module 10, each of the coupling straps, such as coupling straps 36, 38, or 46, consist of two wafers, 52 and 54. Wafer 52, which is closest to the interstage member, is an electrical insulator and thermal conductor, such as ceramic. Wafer 54, which is in contact with the thermoelements T is an electrical and thermal conductor, such as copper. Each of the electrical conducting wafers 54 must not touch any of the other electrical conducting wafers.

When building module 10, each of the wafers 52 and 54 must be individually soldered in the proper place. This is a very tedious, time consuming and expensive procedure. Furthermore, because of so many individual solder joints, there is likely to be excessive heat losses due to the human error involved, and possible electrical shorting problems.

Figure 3:
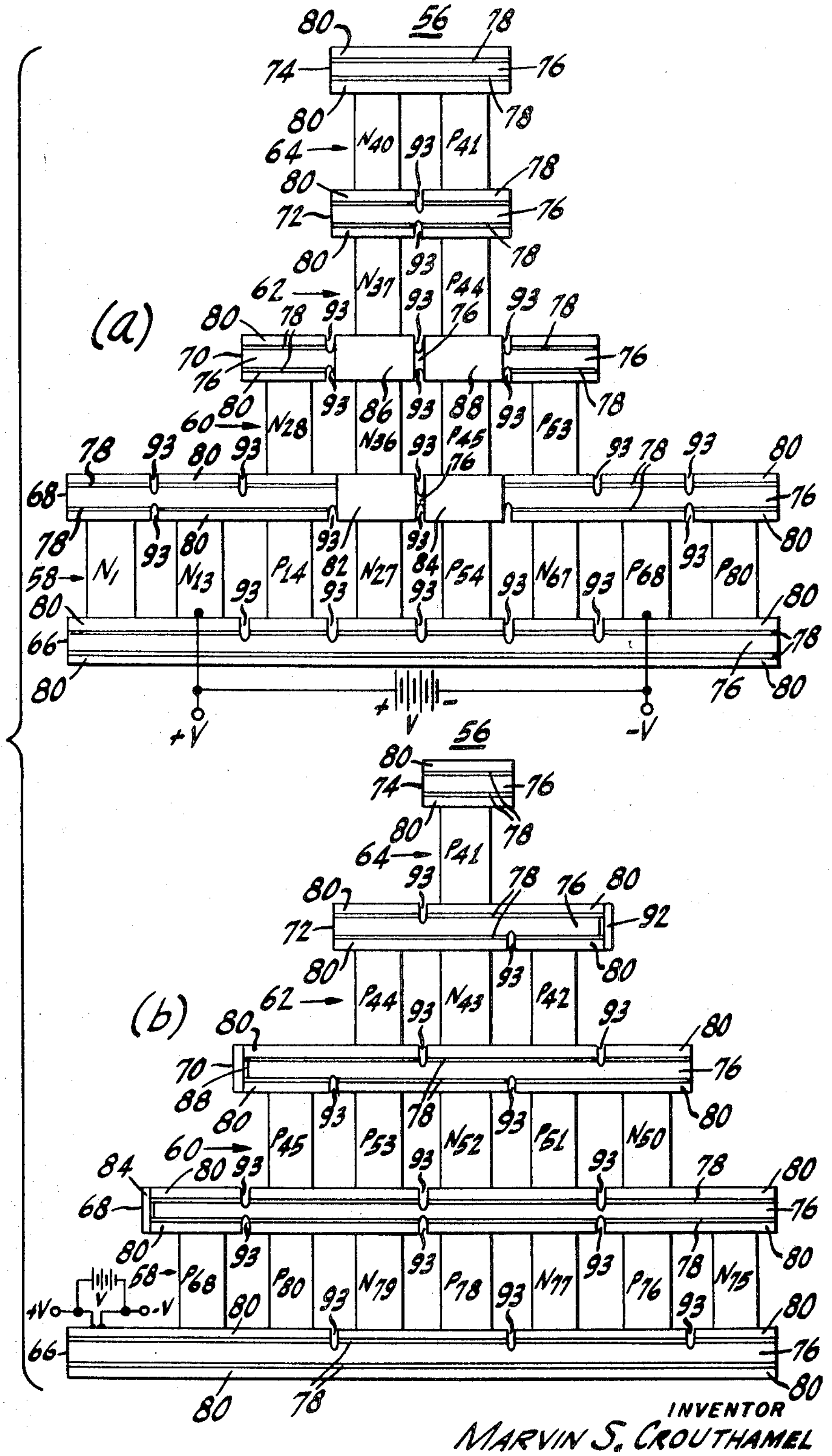

FIG. 3 shows a module 56 which utilizes the teachings of this invention. FIG. 3*a* shows the front view and FIG. 3*b* shows the right side view of a four stage thermoelectric cooling module 56. Module 56, as did module 10, has only one thermoelectric array which includes all of the thermoelements on each of the four stages 58, 60, 62 and 64, and therefore a single source of power V may be used. The current path for the array will be explained in detail hereinafter when reference is made to FIG. 4.

Stage 58 is separated from the heat-rejecting apparatus (not shown) by interstage member 66. Stages 58 and 60, 60 and 62, and 62 and 64 are respectively separated by interstage members 68, 70, and 72, and stage 64 and the heat-absorbing apparatus (not shown) are separated by interstage member 74. Each of the interstage members 66–74 includes a layer 76 of a good heat conducting but electric-insulating material, such as beryllia. Each of the interstage members 66–74 further include a metallized layer 78 which is attached to layer 76 and onto which is plated a conducting layer 80. Layer 78 may consist of a molybedum-manganese-glass slurry which is fired onto the beryllia layer and onto which is plated nickel and copper. The total thickness of layer 78 is about 0.8 mil. Layer 80 may be, for instance, soft copper, which is initially plated on layer 78 to a thickness of about 12 mils and subsequently ground off evenly to a thickness of about 10 mils. The thickness of layer 76 is not critical.

Interstage members 68, 70, and 72 further include layers of metallization and plating, as described above, over a portion of one of their edges. These layers serve as interstage coupling pads 82, 84, 86, 88, 90, and 92 which allow the current path to be transferred from one stage to the next without having to manually attach additional wire leads, as shown in FIG. 1.

Figure 4:
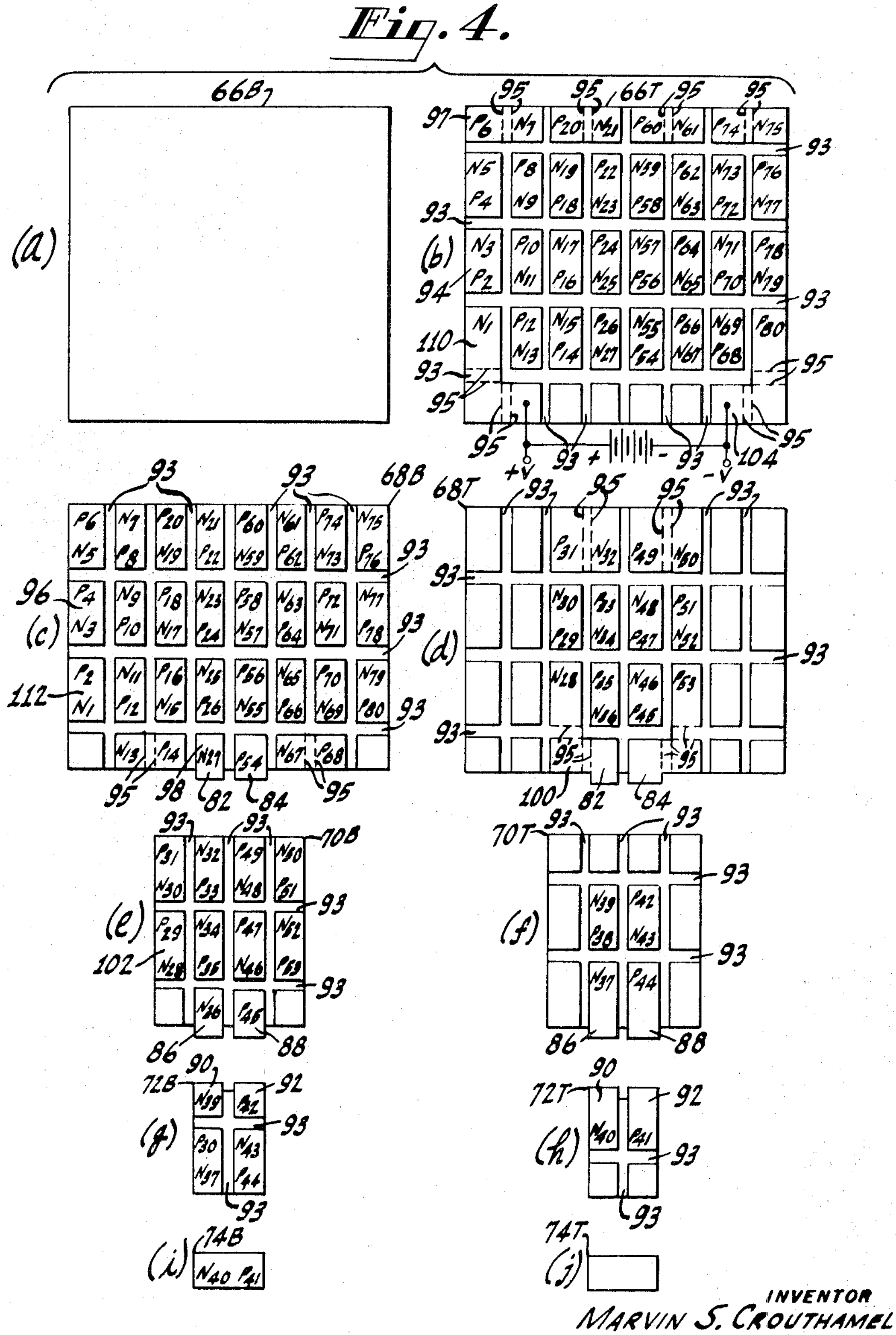

FIG. 4 shows how grooves 93 are cut in each interstage member to form connecting pads which determine the proper current path for the array. These grooves 93 are cut completely through both layers 80 and 78 and slightly into layer 76 of each interstage member so that each pad is electrically isolated from every other pad. These cuts can be made, for instance, with any multicut, abrasive slurry, wire cutting machine which is commercially available. The width of the cut is about 3 mils and the size of a normal pad is 91 by 44 mils. A half pad is 44 by 44 mils.

FIG. 4*a* refers to the bottom side 66B of interstage member 66, FIG. 4*b* refers to the top side 66T of interstage member 66. Similarly, FIGS. 4*c*, 4*d*, 4*e*, 4*f*, 4*g*, 4*h*, 4*i*, and 4*j* refer respectively to the bottom side and top side 68B, 68T, 70B, 70T, 72B, 72T, 74B, and 74T of interstage members 68, 70, 72 and 74.

It is to be understood that views in FIGS. 4*b*, 4*d*, 4*f*, 4*h*, and 4*j* are of the top sides of the respective interstage members looking at each individual member from the top of the module 56 down toward the member 66. The views of FIGS. 4*a*, 4*c*, 4*e*, 4*g*, and 4*i* are of the bottom sides of the respective interstage members looking at each individual member from the member 66 up toward the top of the module 56.

No grooves are cut in bottom side 66B, although they may be so cut without hindering the performance of module 56. Grooves 93, however, are cut as shown in FIGS. 4*b*–4*h*. The dashed lines 95 shown in FIGS. 4*b*–4*d* represent grooves which were initially cut but subsequently filled in so that the pads initially formed are thereafter electrically coupled. They may be coupled by deforming the soft copper of layer 80 until it fills in the gap caused by the groove.

The thermoelements which are included in the module are shown either as N or P for the N-type and the P-type respectively used. FIGS 4*b* and 4*c* show the positioning thermoelements for the first stage; FIGS 4*d* and 4*e* the second stage; FIGS. 4*f* and 4*g* the third stage; and FIGS 4*h* and 4*i* the fourth stage. The thermoelements are numerically designated in an order from 1–80; the order beginning with 1, follows the path of the current from the positive side of the source +V back to the negative side −V. In other words, current is applied along a path from +V to pad 110 on interstage member side 66T which, as can be seen in FIG. 4*b*, is coupled to the hot side of thermoelement $N_1$. The current path continues through thermoelement $N_1$ to pad 112 which is on interstage member side 68B and which couples the cold side of thermoelements $N_1$ and $P_2$, as shown in FIG. 4*c*. The current path continues through pad 112 and through thermoelement $P_2$ to pad 94, which, as seen in FIG. 4*b*, couples the hot sides of the thermoelements $P_2$ and $N_3$. The current path continues through thermoelement $N_3$ to pad 96 on interstage member side 62B and so forth in this manner up the left column of module 56, as seen in FIGS. 4*b* and 4*c* until it reaches the hot side of thermoelement $P_6$, and pad 97. Pad 97 couples the hot side of thermoelement $P_6$ to the hot side of thermoelement $N_7$, which is in the second from the left column of module 56. The current path continues down the second from the left column, back up the third from the left column and finally down the fourth from the left column, until it reaches the cold side of thermoelement $N_{27}$, and pad 98. Pad 98 is coupled to interstage coupling pad 82, so the current path continues through interstage coupling pad 82 to pad 100 on the top side 68T of interstage member 68. Pad 100 is coupled to the hot side of thermoelement $N_{28}$ in the second stage 60 and the current path continues up through thermoelement $N_{28}$ to pad 102, as seen in FIGS. 4*d* and 4*e*. The current path continues up the left column of the second stage, which includes the thermoelements $N_{28}$ through $P_{31}$, over to and back down the second column from the left of the second stage which includes thermoelements $N_{32}$ through $N_{36}$. The path then goes through interstage coupling pad 86 to thermoelement $N_{37}$, through the left column of the third stage which includes thermoelements $N_{37}$ through $N_{39}$ to interstage coupling pad 90. This is seen in FIGS. 4*f* and 4*g*. The path continues up ininterstage coupling pad 90 to thermoelement $N_{40}$, across interstage side 74B, down thermoelement $P_{41}$, through interstage coupling pad 92 to thermoelement $P_{42}$. The current path continues in this same manner down the right side of module 56, and eventually goes through thermoelement $P_{80}$, pad 104 and to the negative side of the source −V.

There is almost no chance that the current path would be short-circuited in module 56 because of the exact manner in which the coupling pads are formed and positioned. The heat losses due to the interstage members is greatly reduced due to the reduced number of manual soldering operations involved, and cracking problems due to expansion and contraction are substantially reduced by using a beryllia substrate as the interstage member since the coefficient of expansion of beryllia is approximately one-third that of copper. Furthermore, where small size is desirable, pads formed by this method can be made considerably smaller than those formed by prior techniques.

What is claimed is:

1. In a thermoelectric device of the type comprising a plurality of electrically and thermally interconnected thermoelectric stages stacked on one another, each stage including at least a pair of thermoelements of opposite conductivity electrically interconnected in series, said stages being so arranged such that heat transfers through the thermoelements of each stage in parallel from one stage to the next adjacent stage, said stages being electrically and thermally interconnected to permit current to flow through the thermoelements, selected ones of said thermoelements in each of said stages being electrically insulated from the remaining thermoelements while being thermally connected to the next adjacent stage, the improvement comprising a plurality of thermoelement array connecting members electrically and thermally interconnecting said stages, said members each including an electrically insulating and thermally conductive layer and a plurality of electrically and thermally conductive pads of predetermined thickness disposed in spaced coplanar relationship on each side of said layer the spaced relationship of adjacent pads being a distance less than the thickness of said pads, each of said pads being electrically isolated from the remaining pads, one of said members being disposed between two of said stages interconnecting said two stages, said intermediate member further including at least one electrically conductive coupling strap disposed on an edge of said layer electrically coupling a pad on each of said sides to each other, said pads and said coupling strap being electrodeposited on said layer, said pads, said straps, and said thermoelements providing a tortuous series electrical path within and between said stages while minimizing thermal radiation losses due to said pad spacing which might otherwise occur.

2. The device of claim 1 wherein adjacent ones of said pads are spaced 3 to 5 mils from each other on each side of said layer in a grid arrangement, said pads being 10 mils thick.

3. The device of claim 2 wherein said layer is beryllia and said pads are copper.

4. The device of claim 2 wherein each of said stages includes a different number of said thermoelements.

5. The device of claim 2 wherein said plurality of stages includes four stages.

* * * * *